US008956741B1

(12) United States Patent
Li et al.

(10) Patent No.: US 8,956,741 B1
(45) Date of Patent: Feb. 17, 2015

(54) MAGNETIC RECORDING MEDIA WITH SMALL GRAIN SIZE AND NARROW C-AXIS DISPERSION BY USING DUAL SEED LAYER WITH SUBSTRATE BIAS

(75) Inventors: Tuqiang Li, Cupertino, CA (US); Donald C. Stafford, San Jose, CA (US); Sudhir S. Malhotra, Fremont, CA (US); Tsutomu T. Yamashita, San Jose, CA (US)

(73) Assignee: WD Media, LLC, San Jose, CA (US)

( * ) Notice: Subject to any disclaimer, the term of this patent is extended or adjusted under 35 U.S.C. 154(b) by 204 days.

(21) Appl. No.: 13/174,604

(22) Filed: Jun. 30, 2011

(51) Int. Cl.
*G11B 5/66* (2006.01)

(52) U.S. Cl.
USPC ........................................ 428/831; 428/831.2

(58) Field of Classification Search
USPC ............................... 428/831, 831.2, 666, 680
See application file for complete search history.

(56) References Cited

U.S. PATENT DOCUMENTS 6,410,133 B1 6/2002 Kirino et al.
6,472,047 B1 10/2002 Kirino et al.
6,749,955 B2 6/2004 Kirino et al.
6,866,948 B2 3/2005 Koda et al.
7,033,686 B2 4/2006 Hirayama et al.
7,141,316 B2 11/2006 Iwasaki et al.
7,226,674 B2 6/2007 Koda et al.
7,824,785 B2 11/2010 Inamura et al.
2003/0134154 A1 7/2003 Kirino et al.
2005/0053795 A1 3/2005 Kubota
2005/0214588 A1 9/2005 Iwasaki et al.
2006/0090998 A1 5/2006 Honda et al.
2007/0153419 A1 7/2007 Arai et al.
2007/0172706 A1 7/2007 Chen
2009/0296278 A1 12/2009 Inamura et al.
2010/0086809 A1 4/2010 Kuboki
2010/0110588 A1 5/2010 Arai et al.
2010/0140727 A1 6/2010 Shimatsu et al.
2010/0247964 A1* 9/2010 Onoue et al. .................. 428/800
2010/0309580 A1 12/2010 Tonooka et al.

* cited by examiner

*Primary Examiner* — Holly Rickman

(57) ABSTRACT

Media may be produced with narrow c-axis dispersion while having small grain size and high grain density. A dual seed layer design and a substrate bias voltage may be applied during deposition of the seed layer are used in the media. In some embodiments, the first seed layer is an amorphous material because of a high content of elements with large atomic sizes. Application of the substrate bias during deposition of the second seed layer may reduce the grain size and may narrow c-axis dispersion.

14 Claims, 4 Drawing Sheets

Protective layer 210
Magnetic layers 209
IL 208
Seed layer 2 207
211
Seed layer 1 206
SUL 205
Substrate 204

MAGNETIC RECORDING MEDIA WITH SMALL GRAIN SIZE AND NARROW C-AXIS DISPERSION BY USING DUAL SEED LAYER WITH SUBSTRATE BIAS

TECHNICAL FIELD

This invention relates to the field of magnetic recording and more specifically, to seed layers for magnetic recording media.

BACKGROUND

For all types of substrates, perpendicular magnetic recording (PMR) technology is being employed in an effort to increase areal density. Generally, PMR media may be partitioned into two primary functional and structural regions: a soft magnetic underlayer (SUL) and a magnetic recording layer(s) (RL). FIG. 1 illustrates portions of a conventional perpendicular magnetic recording disk drive system having a recording head 101 including a trailing write pole 102 and a leading return (opposing) pole 103 magnetically coupled to the write pole 102. An electrically conductive magnetizing coil 104 surrounds the yoke of the write pole 102. The bottom of the opposing pole 103 has a surface area greatly exceeding the surface area of the tip of the write pole 102. As the magnetic recording disk 105 is rotated past the recording head 101, current is passed through the coil 104 to create magnetic flux within the write pole 102. The magnetic flux passes from the write pole 102, through the disk 105, and across to the opposing pole 103 to record in the PMR layer 150. The SUL 110 enables the magnetic flux from the trailing write pole 102 to return to the leading opposing pole 103 with low impedance.

Typically, higher areal densities are achieved with well-isolated smaller grains in the PMR layer. A higher magnetocrystalline anisotropy constant ($K_u$) is typically required to resist the demagnetization effects of the perpendicular geometry and to keep the smaller grains thermally stable to reduce media noise. For example, smaller grain size (<7 nm) and high magnetocrystalline anisotropy ($K_u$) $L1_0$ ordered FePt media can achieve areal density beyond 1 Tb/in$^2$ magnetic recording.

High density perpendicular magnetic recording (PMR) medium requires high signal to noise ratio (SNR) and high thermal stability (high KuV/kT). Small grains with high grain density and good crystallographic orientation of the c-axis perpendicular to the plain of the media, i.e., narrow c-axis dispersion, can reduce medium noise and increase SNR. For PMR media the grain size can be reduced by decreasing the thickness of the IL that the magnetic layer is deposited on, or by using high deposition pressure. However, c-axis dispersion can be degraded by decreasing the IL thickness or using too high deposition pressure.

Increasing the thickness of the IL Ru in current PMR media can reduce the $\Delta\theta_{50}$ of the Ru (00.2) and Co (00.2). However, there is a trade off between $\Delta\theta_{50}$ and grain size. Thicker IL increases grain size and also increases the spacing from the SUL, thereby reducing the media writability. It would be beneficial to reduce IL thickness to improve OW under narrow track pitch recording.

Using high IL deposition pressure can also reduce grain size. However, this may introduce undesirably many voids and defects and therefore harm reliability performance.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiments of the present invention. It will be apparent, however, to one skilled in the art, that many of these specific details may not need to be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

High density PMR media may be created by providing high SNR with high bit density along the track direction and high over write (OW) performance under narrow track pitch with high track density along off-track direction. Small grains with high grain density and narrow c-axis dispersion can reduce medium noise and increase SNR. It is preferable that the c-axis of the crystalline media be well oriented perpendicular to the plane of the media. How well oriented the c-axis of the magnetic layer with hexagonal crystal structure is oriented is referred to as c-axis dispersion, which can be obtained from the $\Delta\theta_{50}$ of the (00.2) reflections of the Cobalt and Ruthenium using the X-ray rocking curve diffraction technique. A narrower $\Delta\theta_{50}$ indicates less c-axis dispersion and better out of plane orientation of the c-axis.

Certain embodiments of the present invention relate to media produced with narrow c-axis dispersion while having small grain size and high grain density. A dual seed layer design is used, and substrate bias voltage is applied during deposition of the seed layer. In some embodiments, the first seed layer is an amorphous film, made with sufficient elements with large atomic sizes. Application of a substrate bias during deposition of the second seed layer reduces the grain size and improves c-axis dispersion.

Figure 1:
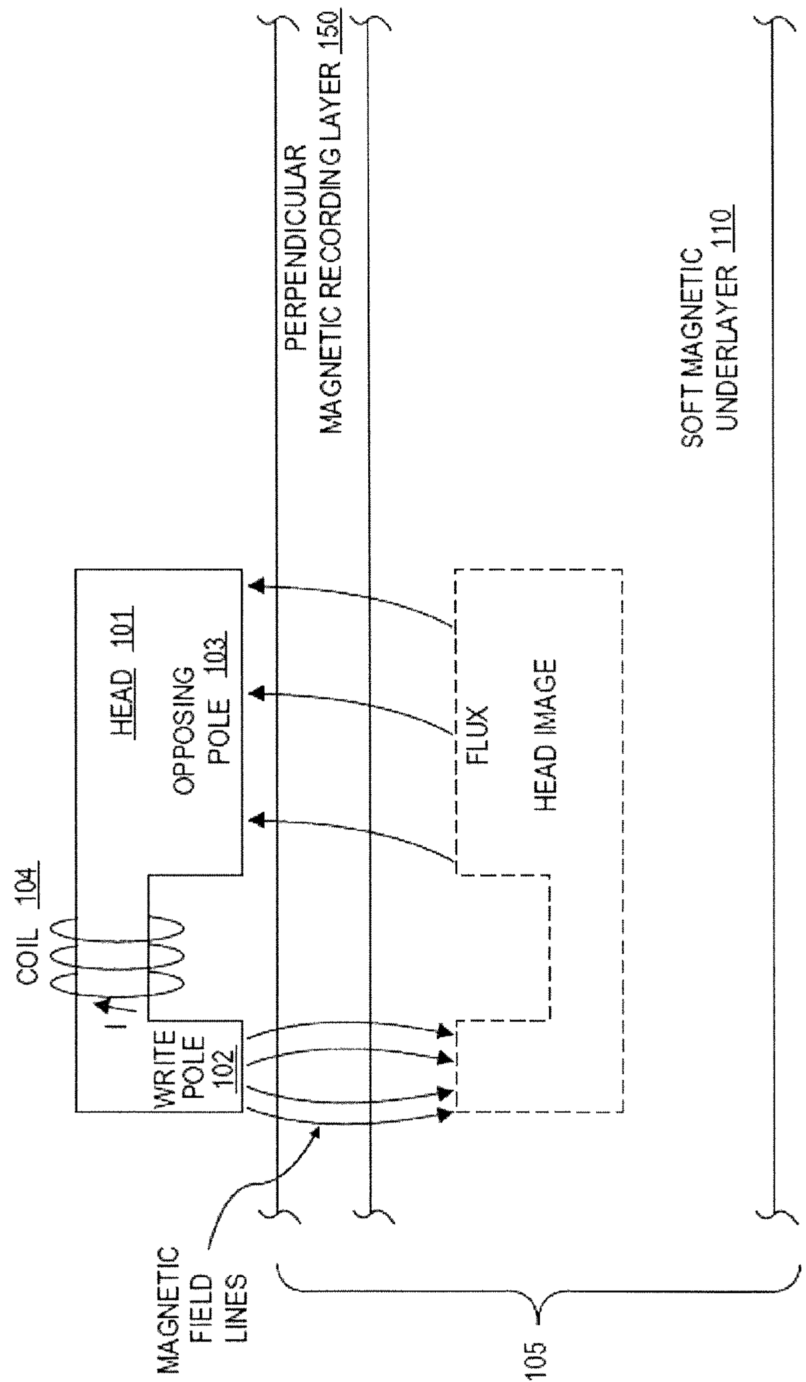
FIG. 1 illustrates portions of a conventional perpendicular magnetic recording disk drive system.
Figure 2:
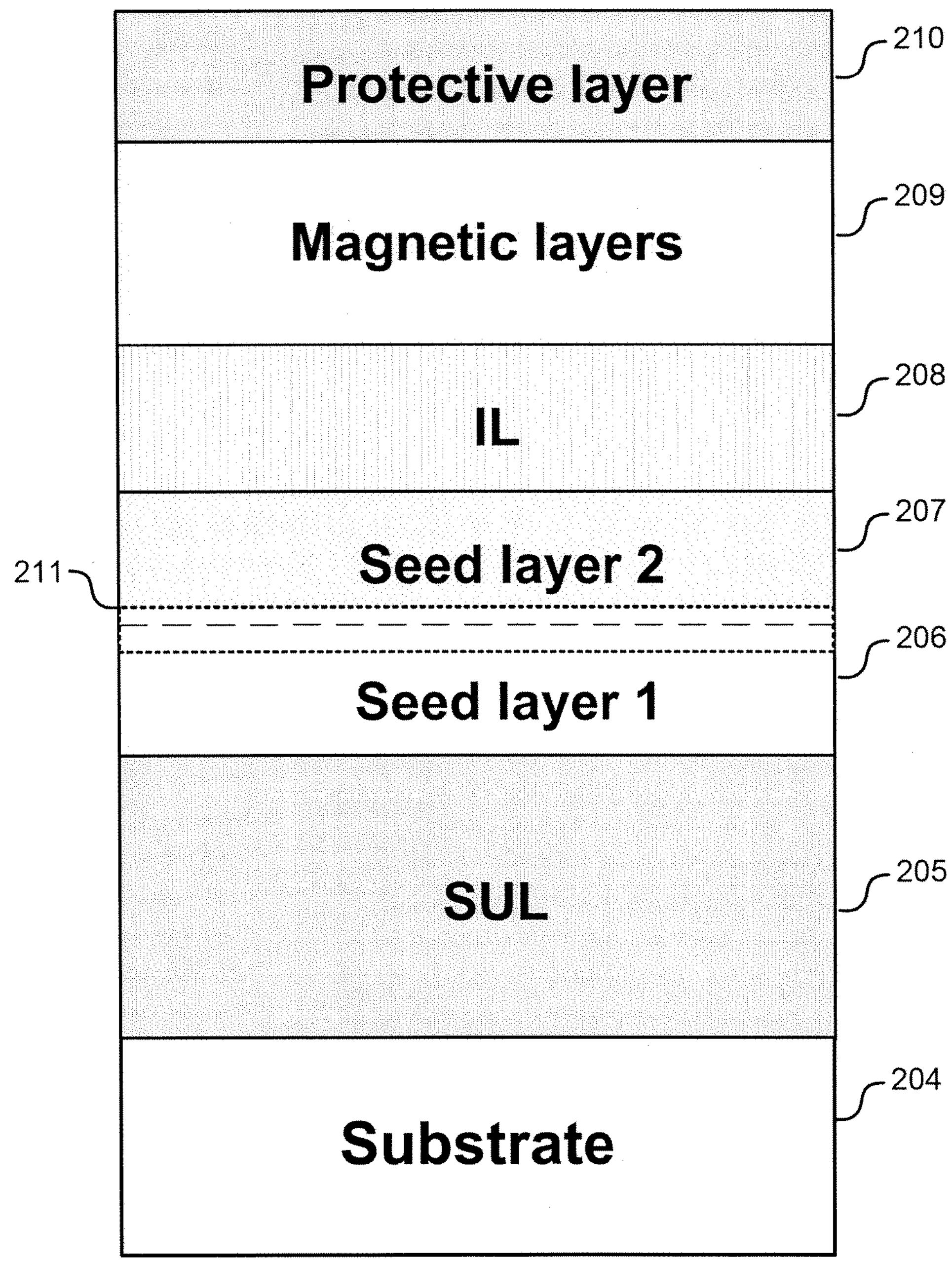
FIG. 2 illustrates magnetic media layers for magnetic media implemented in accordance with an embodiment of the invention.

FIG. 2 illustrates a magnetic media layer structure implemented in accordance with an embodiment of the invention. A substrate 204 provides a foundation and structural support for the magnetic medium layers. Substrates employable in certain embodiments of the invention include glass or metal substrates. Glass substrates that may be used include, for example, a silica containing glass such as borosilicate glass and aluminosilicate glass. Metal and metal alloy substrates that may be used include, for example aluminum magnesium (AlMg) substrates coated with plated NiP. The substrate surface (or the plated NiP surface) is polished. Substrates are known in the art and accordingly a more detailed discussion is not provided.

A soft magnetic underlayer (SUL) 205 is deposited over the substrate 204. As described above, the SUL 205 enables the magnetic flux from the trailing write pole of a magnetic write head to return to the leading opposing pole with low impedance. Generally, the SUL 205 may include any materials known in the art. The SUL 205 itself may be a laminate or multilayer stack of a plurality of soft magnetic layers separated by nonmagnetic or antiferromagnetic films. In one exemplary embodiment, the SUL 205 includes a synthetic antiferromagnet (SAF) structure comprising two amorphous soft ferromagnetic layers (e.g., CoTaZr or CoFeTaZr, etc.) antiferromagnetically coupled with one another across a spacer layer (e.g. ruthenium (Ru)) there-between. The thickness of the SUL 205 will generally be in the range of 5 nm to 60 nm.

Deposited over the SUL 205 is a first seed layer 206. In some embodiments, the first seed layer 206 may be deposited on the SUL 205. First seed layer 206 comprises an alloy having a large content of elements with large atomic sizes. Additionally, the first seed layer 206 may have an amorphous structure. The first seed layer 206 may have a range of thicknesses, and in a preferred embodiment is between 0.5 and 4 nm. In some embodiments, the first seed layer 206 may have more than 12 at. % and less than 80 at. % elements with large atomic sizes. In particular embodiments, the large atomic sized elements have atomic radii greater than 1.35 Å. For example, the elements may comprise Tantalum (Ta), Zirconium (Zr), Titanium (Ti), Tungsten (W), Molybdenum (Mo) or Niobium (Nb). Generally, the large atomic sized elements may comprise one or more of these elements, so long as the total amount of large atomic sized elements exceeds 12 at. %. For example, the first seed layer 206 might comprise 3 at. % Ta and 9 at. % Zr. In a preferred embodiment, the total amount of large atomic sized elements exceeds 15 at. %. In addition of the large atomic sized elements, the first seed layer 206 comprises smaller atomic sized elements, for example, elements with sizes less than 1.35 Å, such as Ni, Co, Cr or Fe. In a specific embodiment, the first seed layer 206 comprises between 12 at. % and 80 at. % Ta with a remainder comprising a mixture of 15 at. % Cr, 4 at. % Mo, and 81 at. % Ni.

The illustrated medium further comprises a second seed layer 207 deposited on the first seed layer 206. The second seed layer has a crystalline structure that seeds the crystal growth of the interlayers 208 and magnetic layers 209. In some embodiments, the second seed layer 207 has a face-centered cubic structure with (111) preferred orientation with respect to a surface plane of the recording medium or a hexagonal close packed structure with (0001) preferred orientation with respect to the surface plane of the recording medium. Intermixing between the first seed layer 206 and the second seed layer 207 reduces the lateral center-to-center grain size. The large atomic sized elements present in the first seed layer 206 reduce the grain size from the initial growth stage of the second seed layer 207. In some embodiments, the second seed layer 207 has a thickness between 2 to 10 nm, with a layer of intermixing 211 with the first seed layer between 0.5 and 2 nm. The second seed layer 207 may have a grain size of 3 to 10 nm center-to-center, with preferred sizes between 4 to 8 nm center-to-center. In a particular embodiment, the second seed layer 207 comprises an alloy of Cr, Mo, and Ni, such as 15 at. % Cr, 4 at. % Mo, and 81 at. % Ni.

The illustrated region of intermixing 211 has a concentration gradient of large atoms form the first seed layer 206 mixed with the atoms of the second seed layer 207. The properties of both seed layers 206 and 207 affect the intermixing layer 211 and the crystalline layers 207, 208, and 209. For example, increasing the number of large atoms in the seed layer 206 (through increasing the thickness of the seed layer 206 and the concentration of large atoms in the seed layer 206) decreases the grain size in the second seed layer 207.

The illustrated embodiment further comprises at least one crystalline interlayer 208 deposited on the second seed layer 207. The interlayer 208 mediates the coupling between the magnetic layer 209 and the SUL 205 by changing the spacing between the magnetic layer 209 and the SUL 205. The interlayer 208 may comprise various materials, such as Ni, W, Ru, Co, Cr, Pt, Pd, Re or alloys thereof. The small grain size provided by the second seed layer 207 allows interlayer thicknesses between 3 and 25 nm with acceptable grain sizes and low c-axis dispersion of the media.

In the illustrated embodiment, one or more magnetic layers 209 are deposited over the interlayer 208. The magnetic layers 209 comprise hard magnetic materials suitable for PMR recording, such as CoPt and CoCrPt, or CoPt or CoCrPt combined with one or more oxides, such as SiO2, TiO2, Cr2O3, or Ta2O5.

Protective layers 210 are deposited over the magnetic layers 209. For example, the protective layers 210 may comprise an overcoat and a lubricant. The overcoat may comprise any typical magnetic medium protective overcoat, such as a carbon-based material like hydrogenated or nitrogenated carbon. The lubricant may comprise any typical lubricant used in magnetic media, such as perfluoropolyether or phosphazene containing lubricant.

Figure 3:
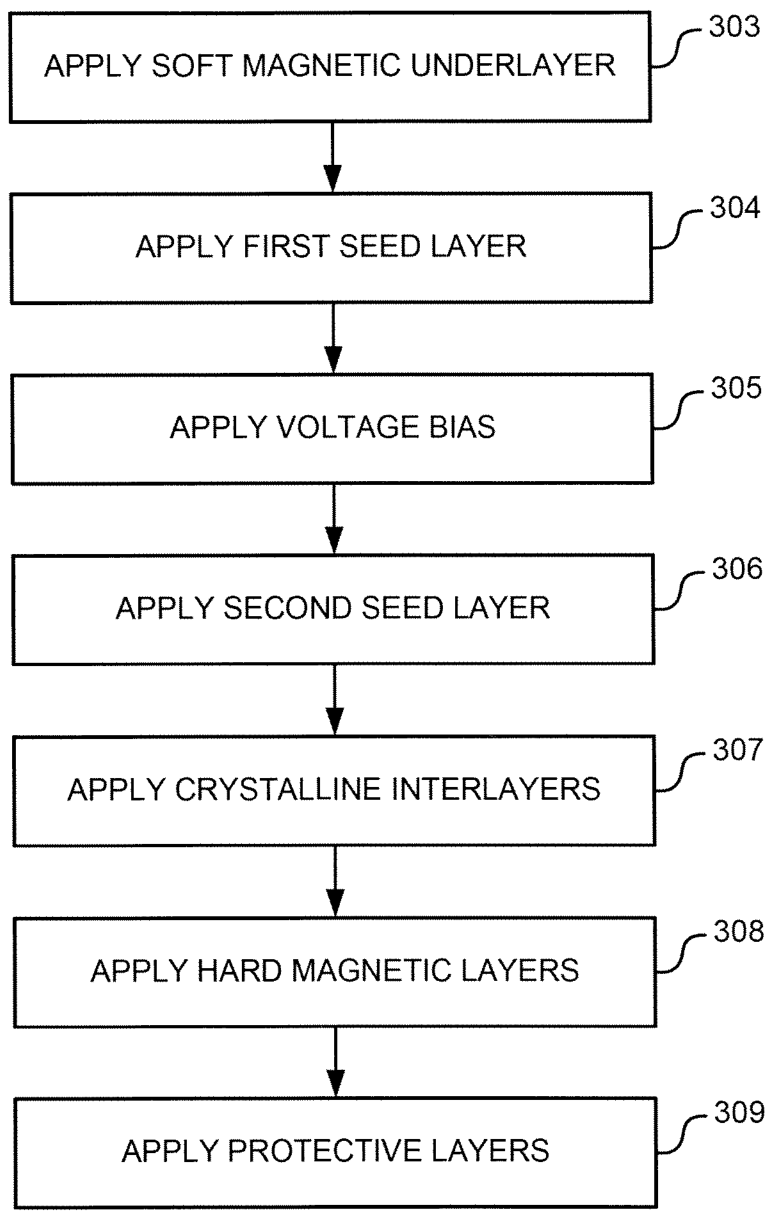
FIG. 3 illustrates a method of manufacturing a magnetic media in accordance with an embodiment of the invention.

FIG. 3 illustrates a method of manufacturing a magnetic media in accordance with an embodiment of the invention. In step 303, a soft magnetic underlayer is applied over a substrate. The application of the soft magnetic underlayer may be performed using any conventional process. For example, a DC magnetron growth process in a low pressure atmosphere, such as 3 to 10 milliTorr may be used. Alternatively, RF sputtering may be employed.

In step 304, the first seed layer is applied. This first seed layer may be applied with a similar process used for the soft magnetic underlayer. For example, DC magnetron sputtering at low pressure such as at 3 to 10 milliTorr may be used. Alternatively, RF sputtering may be employed.

In step 305, a substrate bias voltage is applied. The substrate bias causes the region of intermixing to form between the first and second seed layers. For example, the substrate bias voltage may be more than −100V. More typically, the bias voltage may be between −200 and −800 V, and preferably between −300 and −600 V. Although in the illustrated embodiment, the bias is applied 305 after application of the first seed layer 304, in other embodiments the bias may be applied 305 before application of the first seed layer 304.

The second seed layer 306 is sputtered while the bias voltage is applied to the substrate. The bias voltage causes a region of intermixing to form between the second seed layer and the first seed layer, and reducing the grain size of the second seed layer. Similar processes may be employed for application of the second seed layer as for application of the first seed layer and SUL. In one embodiment employing DC magnetron sputtering, sputter pressure between 3 to 10 milliTorr is preferred for the second seed layer.

After application of the second seed layer 306, the substrate bias voltage may be removed. Further crystalline interlayers 307 are applied to the second seed layer. As discussed above, these crystalline interlayers are seeded by the second seed layer. The interlayers may be applied using any convention process. The hard magnetic layers 308 are then applied to the interlayers in the conventional manner. Afterward, protective layers or lubricants may be applied 309. In other embodiments, additional layers may be applied as appropriate without departing from the scope of the invention. For example, an adhesion layer may be applied to the substrate before application of the SUL.

Figure 4:
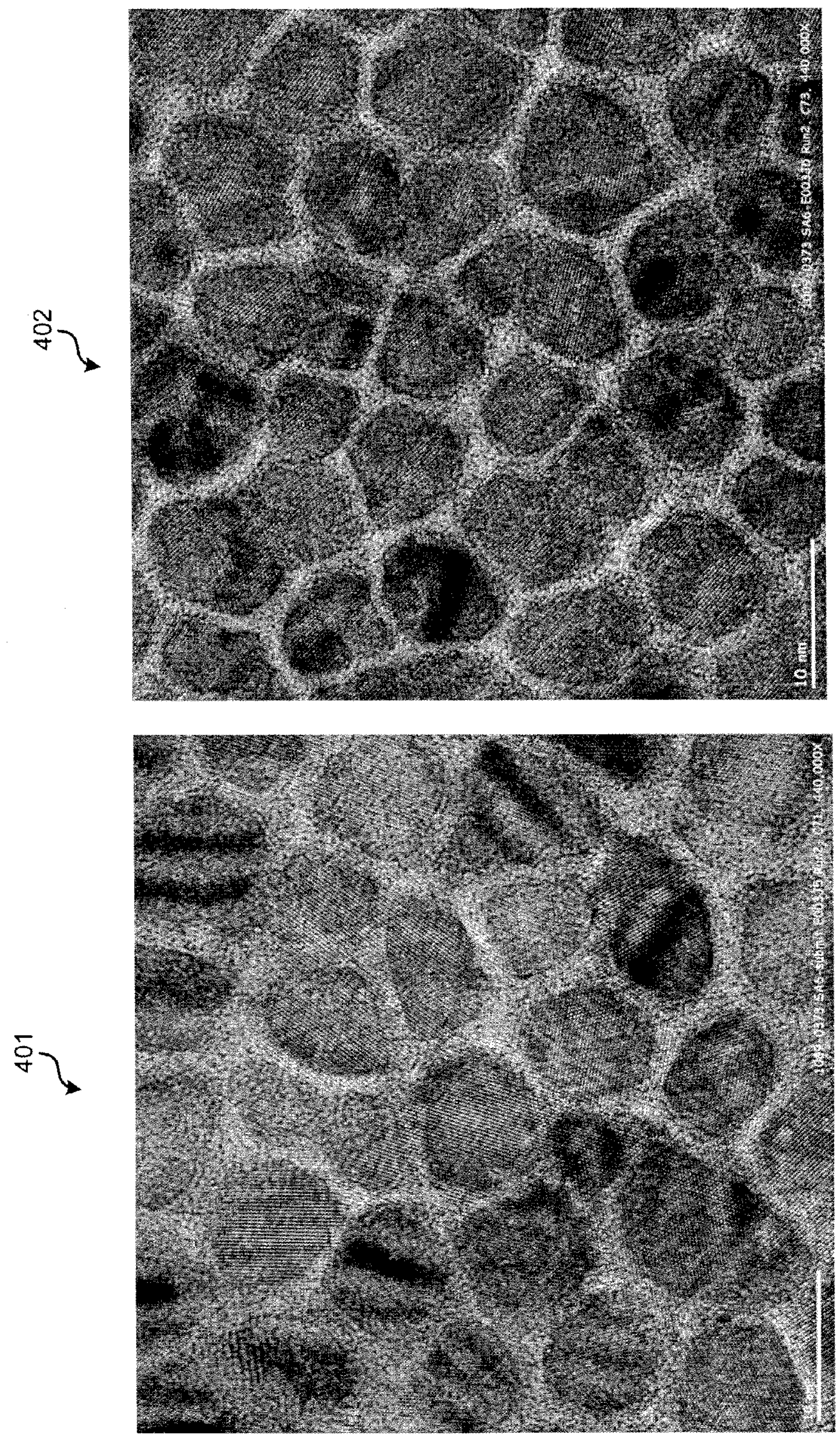
FIG. 4 illustrates a TEM comparison between a nominal seed design 401 and a dual seed layer with bias design 402.

FIG. 4 illustrates a TEM comparison between a nominal seed design 401 and a dual seed layer with substrate bias voltage applied 402. In the illustrated embodiment, media lateral center to center grain size was reduced from 8.14 nm to 7.76 nm by using dual seed layers with substrate bias.

Additionally, although described in terms of PMR, the present invention may be applied to heat-assisted magnetic recording (HAMR) media. In such embodiments, additional layers such as heatsink layers and capping layers may be applied as appropriate. Additionally, magnetic materials used in the application may be those suited for HAMR media, such as iron platinum (FePt) or iron platinum alloys, such as FePtCu, FePtAu, FePtAg, and FePtNi. In some embodiments, the materials may be additionally doped with carbon. In these embodiments, the seed layers may be disposed under the crystalline interlayer or crystalline heatsink or under the crystalline hard magnetic layer.

In the foregoing specification, some embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A recording medium comprising:

a first seed layer comprising one or more elements having atomic sizes greater than 1.35 Å that constitute between 12 to 39 at. % or between 61 to 80 at. % of the first seed layer;

a second seed layer on the first seed layer;

an interlayer on the second seed layer; and a region of intermixing between the first seed layer and the second seed layer, formed via application of a substrate bias voltage;

wherein the second seed layer comprises an alloy of Cr, Mo, and Ni and the first seed layer and second seed layer are formed from different materials.

2. The recording medium of claim 1, wherein the one or more elements having atomic sizes greater than 1.35 Å comprise Ta, Zr, Ti, W, Mo or Nb; and wherein the first seed layer further comprises Ni, Co, Cr or Fe.

3. The recording medium of claim 1, wherein the first seed layer is amorphous.

4. The recording medium of claim 1, wherein the second seed layer has a face-centered cubic structure with (111) orientation with respect to a surface plane of the recording medium or a hexagonal close packed structure with (0001) orientation with respect to the surface plane of the recording medium.

5. The recording medium of claim 1, wherein the first seed layer is between 0.5 and 4 nm thick, the second seed layer is between 2 and 10 nm thick, and the region of intermixing is between 0.5 and 2 nm thick.

6. The recording medium of claim 1, wherein the second seed layer promotes the interlayer such that the second seed layer has a center-to-center grain size between 3 and 10 nm.

7. A method of manufacturing a recording medium, comprising:

applying a substrate bias voltage before depositing a first seed layer and maintaining the bias voltage during application of the first seed layer and a second seed layer;

depositing the first seed layer over a substrate, the first seed layer comprising one or more elements having atomic sizes greater than 1.35 Å that constitute between 12 to 39 at. % or between 61 to 80 at. % of the first seed layer;

depositing a second seed layer on the first seed layer, such that a region of intermixing occurs between the first seed layer and a second seed layer;

depositing an interlayer on the second seed layer;

wherein the second seed layer comprises an alloy of Cr, Mo, and Ni and the first seed layer and second seed layer are formed from different materials.

8. The method of claim 7, wherein the substrate bias voltage is maintained during the step of depositing the second seed layer to form the region of intermixing between the first seed layer and the second seed layer.

9. The method of claim 8, wherein the substrate bias voltage is between −200V and −800V.

10. The method of claim 7, wherein the one or more elements having atomic sizes greater than 1.35 Å comprise Ta, Zr, Ti, W, Mo or Nb; and wherein the first seed layer further comprises Ni, Co, Cr or Fe.

11. The method of claim 7, wherein the first seed layer is amorphous.

12. The method of claim 7, wherein the second seed layer has a face-centered cubic structure with (111) orientation with respect to a surface plane of the recording medium or a hexagonal close packed structure with (0001) orientation with respect to the surface plane of the recording medium.

13. The method of claim 7, wherein the first seed layer is between 0.5 and 4 nm thick, the second seed layer is between 2 and 10 nm thick, and the region of intermixing is between 0.5 and 2 nm thick.

14. The method of claim 7, wherein the second seed layer promotes the interlayer such that the second seed layer has a center-to-center grain size between 3 and 10 nm.

* * * * *